(12) United States Patent
Xu et al.

(10) Patent No.: US 12,503,367 B2
(45) Date of Patent: Dec. 23, 2025

(54) FREEZING TRANSFER METHOD FOR POROUS CARBON ELECTRODES BASED ON SUBZERO TEMPERATURE AND APPLICATIONS IN SENSORS

(71) Applicant: Zhejiang University, Zhejiang (CN)

(72) Inventors: Kaichen Xu, Zhejiang (CN); Yuyao Lu, Zhejiang (CN); Geng Yang, Zhejiang (CN); Huayong Yang, Zhejiang (CN)

(73) Assignee: Zhejiang University, Hangzhou (CN)

( * ) Notice: Subject to any disclaimer, the term of this patent is extended or adjusted under 35 U.S.C. 154(b) by 0 days.

(21) Appl. No.: 18/737,910

(22) Filed: Jun. 7, 2024

(65) Prior Publication Data
US 2025/0187923 A1    Jun. 12, 2025

(30) Foreign Application Priority Data
Dec. 7, 2023    (CN) .......................... 202311672960.8

(51) Int. Cl.
*C01B 32/184*    (2017.01)

(52) U.S. Cl.
CPC ........ *C01B 32/184* (2017.08); *C01B 2204/22* (2013.01); *C01P 2006/40* (2013.01)

(58) Field of Classification Search
CPC . C01B 32/184; C01B 32/194; C01B 2204/22; H01M 4/8605; H01M 4/8626; H01M 4/8807; H01M 4/8817; H01M 4/8828
See application file for complete search history.

(56) References Cited

U.S. PATENT DOCUMENTS
2021/0095369 A1 *   4/2021   Nam ...................... C23C 16/01

FOREIGN PATENT DOCUMENTS

| CN | 106611638 A |   | 5/2017 |
| CN | 114334643 A |   | 4/2022 |
| CN | 114736477 A | * | 7/2022 |

(Continued)

OTHER PUBLICATIONS

Lu, Yuyao, et al. "Stretchable graphene-hydrogel interfaces for wearable and implantable bioelectronics." Nature Electronics 7.1 (2024): 51-65.*

(Continued)

*Primary Examiner* — Richard M Rump

(57) ABSTRACT

The present disclosure provides a freezing transfer method for porous carbon electrodes based on subzero temperature and applications in sensors, the method including: forming porous carbon electrodes to be transferred on a substrate, introducing a hydrogel material between the porous carbon electrodes to be transferred and a flexible/elastomeric material, expanding the hydrogel material to form a structural coupling with porous carbon, removing the substrate to realize peeling, and completing the transfer of the porous carbon electrodes. According to the present disclosure, fast and complete peeling of the porous carbon electrodes can be realized, a thinner flexible-elastomeric substrate is required, and a composite electrode formed has superior electroconductive stretchability, which helps to realize manufacturing of conformal flexible electronics such as ultrathin flexible or stretchable sensors.

6 Claims, 13 Drawing Sheets

(56) References Cited

FOREIGN PATENT DOCUMENTS

CN  115014597 A  9/2022
CN  116741550 A  9/2023

OTHER PUBLICATIONS

Song, Weixing, et al. "Flexible, stretchable, and transparent planar microsupercapacitors based on 3D porous laser-induced graphene." Small 14.1 (2018): 1702249.*

Wang, Zhengmu, et al. "Mechanically enhanced nested-network hydrogels as a coating material for biomedical devices." Acta Biomaterialia 70 (2018): 98-109.*

Lv, Jian, et al. "Wearable, stable, highly sensitive hydrogel-graphene strain sensors." Beilstein Journal of Nanotechnology 10.1 (2019): 475-480.*

* cited by examiner

Porous graphene ablated by laser on PI surface

Porous graphene transferred to PET substrate coated with hydrogel

Before transfer | Transfer to surfaces of ultrathin elastomers

_(1)_

FREEZING TRANSFER METHOD FOR POROUS CARBON ELECTRODES BASED ON SUBZERO TEMPERATURE AND APPLICATIONS IN SENSORS

CROSS-REFERENCE TO RELATED APPLICATIONS

This application claims priority of Chinese Patent Application No. 202311672960.8, filed on Dec. 7, 2023, the entire contents of which are incorporated herein by reference.

TECHNICAL FIELD

The present disclosure belongs to the technical fields of sensors and electrode preparation, and relates to a method for preparing a stretchable ultrathin electroconductive electrode, and specifically relates to a freezing transfer method for porous carbon electrodes based on subzero temperature and applications in sensors.

BACKGROUND

Skin-like electron devices can be seamlessly attached to human skin or inside the body, and have promising applications in health monitoring, implantable medical research, human-computer interaction, flexible robotics, and augmented reality technique. Reducing the thickness and improving the stretchability of the devices described above can not only improve wearing comfort, but also increase the effective contact between the devices and a surface under test, greatly improving the fidelity of skin or tissue signal acquisition. To develop stretchable electron devices that are compatible with human skin and biological tissues and mechanically conformable, a high carrier mobility ratio, a low modulus, and a wider range of electroconductive stretchability are required at the same time. However, the scalable manufacturing and performance of such stretchable electronics remains challenging, especially using simple and reproducible methods. The currently reported methods for manufacturing stretchable semiconductors include photolithography, thermal evaporation, etc., which are complicated in process and costly.

Laser-induced graphene (LIG) is a porous electroconductive carbon material obtained by high-temperature carbonization of polyimide (PI) thin films by laser direct writing. Having the advantages of convenient digital patterning and molding and adjustable physicochemical properties, LIG has been widely applied to the preparation of various types of physical, chemical, and electrophysiological sensors. Due to the low ductility and higher Young's modulus of PI thin films, LIG is often transferred to other substrates with lower Young's J modulus and excellent stretchability, including, but not limited to, high-molecular polymers such as polydimethylsiloxane (PDMS), styrene-ethylene-butylene-styrene (SEBS) block copolymer, polyurethane (PU), and Ecoflex. However, a larger elastomer thickness (typically >45 μm) is required to provide a larger interfacial peeling force if these high-molecular flexible-elastomeric substrates are utilized to transfer LIG electrodes. Moreover, a larger difference in Young's modulus between LIG and elastomeric polymers limits the intrinsic stretchable electroconductivity (typically at around 40% stretch rate) of a composite electrode formed by the two after transfer.

SUMMARY

To solve the problems in the background, the present disclosure provides a freezing transfer method for porous carbon electrodes based on subzero temperature and applications in sensors. In the method, a hydrogel is taken as an interfacial modulation system to realize the transfer of porous carbon materials to a flexible-elastomeric substrate in a low-temperature environment; and at the same time, a hydrogel interface can further improve the mismatch in mechanical properties between brittle carbon electrodes and the flexible-elastomeric substrate. After successful transfer, the carbon electrode shows a small difference in resistance changes while preserving the physical and chemical properties of the porous carbon materials. A smaller thickness (1-10 μm) of the flexible-elastomeric substrate required in the present disclosure helps to realize manufacturing of ultrathin conformal flexible electronics, and the electroconductive stretchability of a device prepared with an adhesive hydrogel on a PDMS substrate selected in this method can reach 220%, achieving a more than 5-fold increase over the prior art. On the basis of the proposed freezing ultrathin transfer technique, a variety of ultrathin flexible conformal sensors can be designed to realize real-time monitoring of physical, chemical, and electrophysiological signals.

In the present disclosure, a high water content of the hydrogel is utilized, and combined with porous structures of electroconductive carbon electrodes, rapid and complete peeling of the carbon electrodes in low-temperature freezing conditions can be realized. From the macrostructural point of view, the porous carbon electrodes can form an interlocking structure with the crystal water on the surface of the hydrogel under freezing, which ensures a firm interfacial bonding force during the peeling. From the interaction point of view, van der Waals (vdW) interactions and electrostatic interactions between porous carbon surfaces rich in hydrophilic groups and the hydrogel surface containing crystal water can be significantly enhanced in the low-temperature environment. As a result, the shear strength of the interface is increased at a low temperature, providing excellent conditions for completely transferring the porous carbon electrodes. In addition, the flexible/elastomeric material plays a significant role in supporting an ultrathin gel layer during the transfer, which is essential for a successful transfer.

The freezing method based on low temperature is applicable to any hydrogel systems, providing a generalized method that is simple, effective and can be applied in large-scale preparation of soft, electroconductive, and biologically compatible stretchable electron devices.

Specifically, the technical solutions of the present disclosure are as follows.

A freezing transfer method for porous carbon electrodes based on subzero temperature provided by the present disclosure includes: forming porous carbon electrodes to be transferred on a substrate, introducing a hydrogel material between the porous carbon electrodes to be transferred and a flexible/elastomeric material needing to receive the electrodes, expanding the hydrogel material by low-temperature freezing to form a structural coupling with porous carbon, removing the substrate to realize peeling prior to the hydrogel material completely recovering from a frozen state, and completing the transfer of the porous carbon electrodes.

In the above technical solution, further, the porous carbon electrodes to be transferred are laser-induced carbonized graphene materials or other porous carbon materials made by any methods. The laser-induced carbonized graphene materials may be prepared by laser scanning of polymer thin films, such as PI thin film, to generate a porous graphene electroconductive electrode pattern, graphene layers of different thicknesses being generated with different incident intensities of laser. A wavelength of the laser is preferably in a visible or infrared band, as the thermal effect of laser treatment in the two wavelength ranges is more pronounced and helps to carbonization. In addition, the porous carbon electrode materials may be monolayer or multilayer graphene or other carbon materials having a porous structure made by any other methods.

Further, the flexible/elastomeric material is a flexible material, an elastomeric material, or a combination of the two, and specifically may be one or a combination of polyethylene (PE), polypropylene, polyvinyl chloride (PVC), polystyrene, PI, polytetrafluoroethylene (PTFE), PDMS, styrene-butene copolymer, polybutadiene, polyisoprene, natural rubber, ethylene-propylene rubber, butyl rubber, silicone rubber, polyisobutylene, PE-polybutylene, amorphous PE, polyether, polyester, and PU. The flexible/elastomeric material is used as a support layer for the introduced hydrogel material, and a thickness thereof can be very thin and can be less than 10 μm.

Further, prior to the low-temperature freezing, water content of the hydrogel material needs to be controlled to be not less than 10 wt %. After hydrogel material is introduced (e.g. after coating with hydrogel is performed), the treatment of placing into a drying oven, standing, or heating may be performed. The coating with hydrogel may be performed by spin-coating, spray-coating, brush-coating or other means.

Further, the flexible/elastomeric material has a Young's modulus greater than that of the hydrogel material.

Further, the low-temperature freezing has a temperature ranging from −196° C. to −1° C. The lower the temperature of the freezing transfer, the less the time required for the transfer.

Further, surfaces of the porous carbon electrodes and the flexible/elastomeric material are modified by plasma treatment prior to the introduction of the hydrogel material. The plasma treatment is beneficial in improving transfer success rate and inter-sample reproducibility.

Further, the plasma treatment needs to be performed in an oxygen atmosphere.

The present disclosure further provides a stretchable electroconductive electrode, prepared by any method described above. A hydrogel material employed is an adhesive hydrogel, the adhesive hydrogel typically having a bonding strength, i.e., a lap shear strength between a gel and a flexible substrate (e.g., PI, and polyethylene terephthalate (PET)), of not less than 10 kPa.

The present disclosure further provides multifunctional sensors and a system integration (e.g., 4 sensors and 1 multimodal flexible sensing system), all containing a stretchable electroconductive electrode as described above. Real-time monitoring of physical, chemical, and electrophysiological signals such as strain, temperature, humidity, and electrocardiogramh (ECG) is realized by the principles of structural design and multisensory mechanism association.

The method of the present disclosure is to utilize hydrogel as a new interfacial modulation system to further improve the mismatch in mechanical properties between brittle electrodes and an elastomeric substrate. Hydrogel is better in flexibility and biocompatibility for rich in water molecules in structure. The common hydrogel materials generally have a smaller Young's modulus than that of water-free elastomers such as silica gel and rubber, and thus have received more attention in the field of bioelectronic devices. Utilizing the high water content of hydrogel, structural coupling and higher electrostatic interactions with porous carbon electrodes under subzero temperature can be generated, ultimately realizing fast and complete peeling of the carbon electrodes. As shown in FIG. 1, the freezing transfer technique based on low temperature can be mainly applied to the preparation of an ultrathin graphene elastomer composite electrode or ultrathin sensors, and can simultaneously improve the mismatch in mechanical properties between a brittle graphene material and an elastomer by introducing a hydrogel material between the brittle material and the elastomer, and expanding a hydrogel in volume by low-temperature freezing to form a structural coupling with porous graphene materials as well as to enhance the interfacial bonding strength between the graphene and the hydrogel. In addition, as shown in FIGS. 2-4, when an adhesive hydrogel is used, the viscosity of the hydrogel can turn passive cracks of a graphene elastomer system (without hydrogel) into deflective cracks by the interfacial modulation of the hydrogel, which can significantly improve the eletroconductive stretch performance of a graphene elastomeric composite electrode.

The main mechanism of the transfer method for porous carbon electrodes based on subzero temperature can be categorized into several aspects as follows.

(1) From the macrostructural point of view, as shown in FIG. 6, porous carbon materials can form an interlocking structure with water of crystallization on a surface of a hydrogel, which ensures the stability of an interface during peeling.

(2) From the interaction point of view, as shown in the molecular dynamics calculation and peeling characterization results in FIG. 7, in a subzero-temperature environment, the interfacial bonding force including vdW mechanical proprieties and electrostatic interactions between porous carbon surfaces rich in hydrophilic groups and a hydrogel surface containing water of crystallization can be significantly enhanced, which ensures a stronger shear strength of the interface during the peeling.

(3) During the transfer, a flexible/elastomeric material supports a thinner hydrogel layer in terms of mechanical properties, which is indispensable for a successful transfer.

The advantageous effects of the present disclosure are as follows.

The transfer method for a porous carbon electrode pattern based on subzero temperature of the present disclosure is applicable to the rapid and effective transfer of porous carbon materials on hydrogels of any system, with a clear and complete electroconductive pattern after the transfer, a small difference in the resistance changes before and after the transfer, a high transfer efficiency, and the carbon material after the transfer still able to preserve the porous structure and the material's physicochemical properties. Unlike the conventional vacuum transfer method for electroconductive graphene, this transfer method, not limited by the thickness or type of gel and elastomer, can be used to prepare ultrathin electroconductive devices (substrate thickness can be <10 μm). In addition, an electrode based on an adhesive hydrogel prepared by this freezing transfer method has the electroconductive stretchability of 220%, achieving a more than 5-fold increase over the prior art. On the basis of this ultrathin transfer technique for porous carbon electrodes, a variety of conformal flexible/stretchable sensors can be designed and manufactured to enhance wearing comfort.

DETAILED DESCRIPTION

Figure 1:
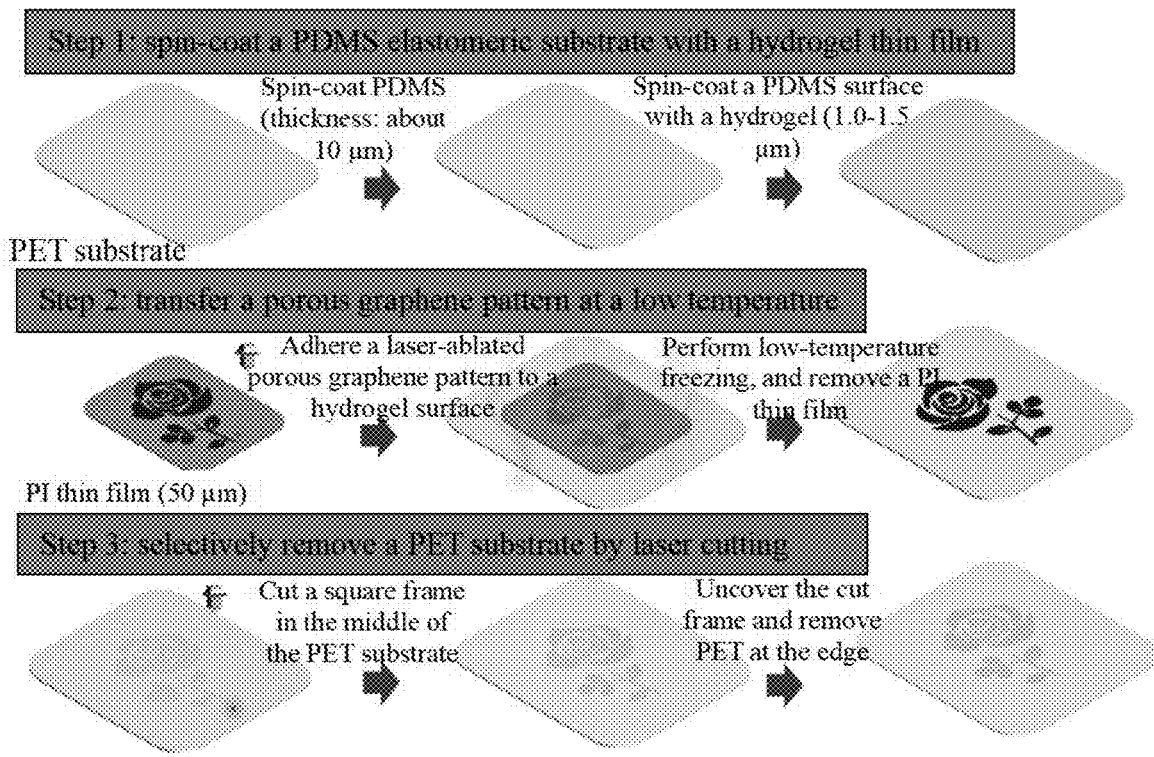
FIG. 1 shows the low-temperature transfer process of a porous graphene material under the action of a hydrogel interface.
Figure 2:
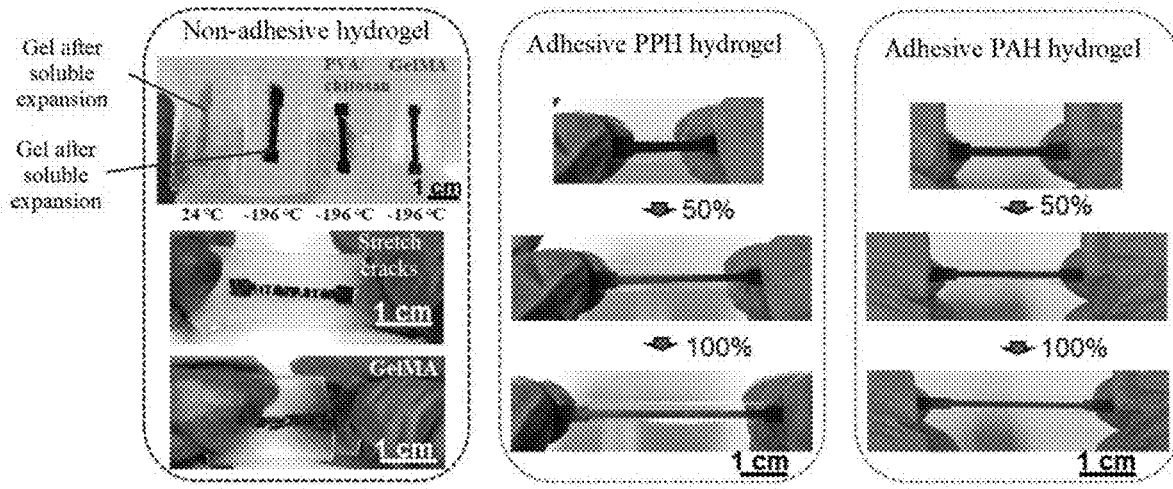
FIG. 2 shows the stretch crack propagation of the porous graphene material on non-adhesive and adhesive hydrogel surfaces.
Figure 3:
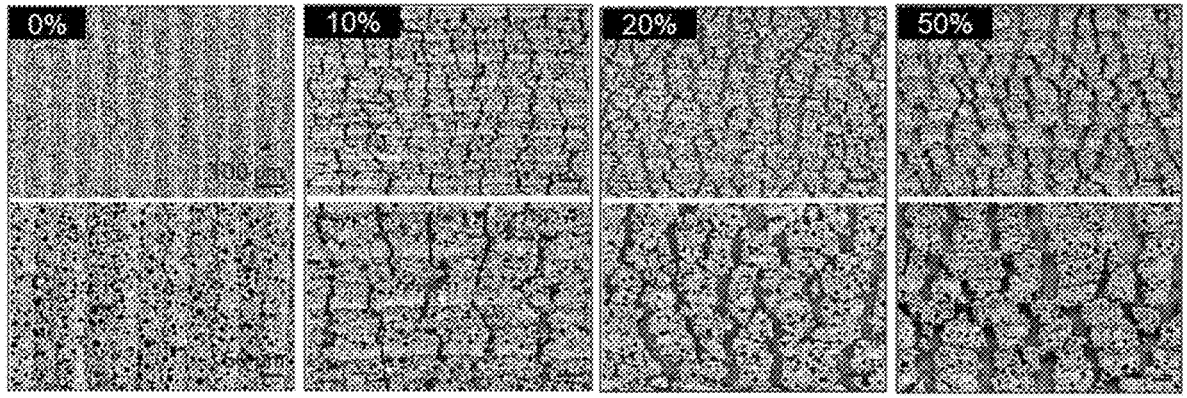
FIG. 3 shows the deflective crack formation of porous graphene on the adhesive hydrogel surface under different stretching states.
Figure 4:
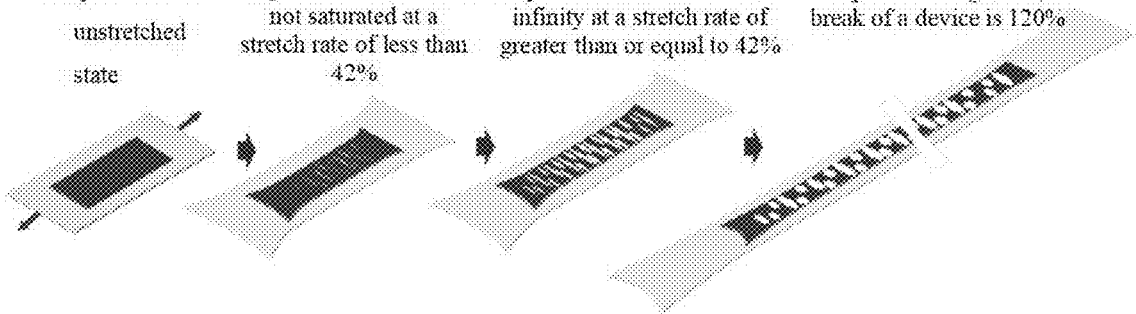
FIG. 4 shows stretch cracks of a porous graphene elastomeric composite material in the presence and absence of a gel layer.
Figure 5:
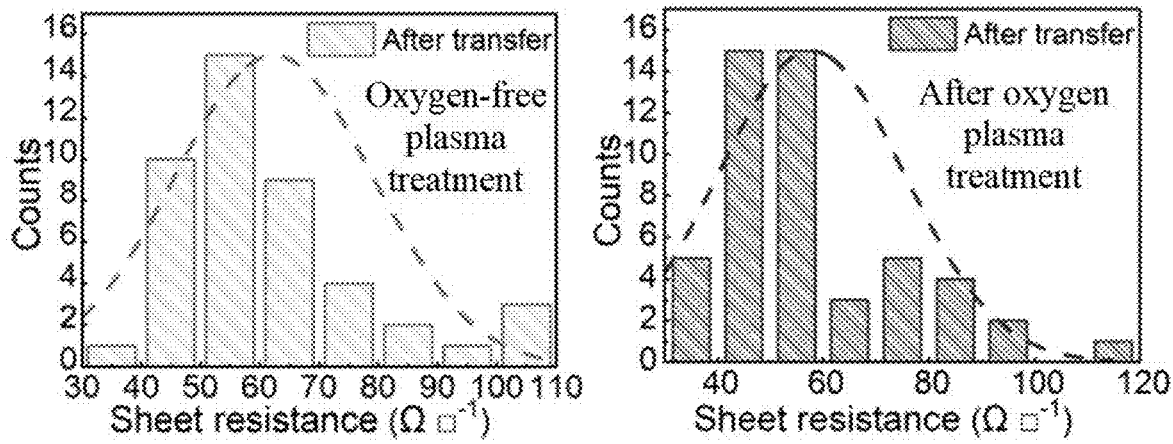
FIG. 5 shows the sample transfer repeatability of an elastomeric substrate coated with an adhesive hydrogel under ambient condition and oxygen plasma treatment conditions (total of 50 samples per group)
Figure 6:
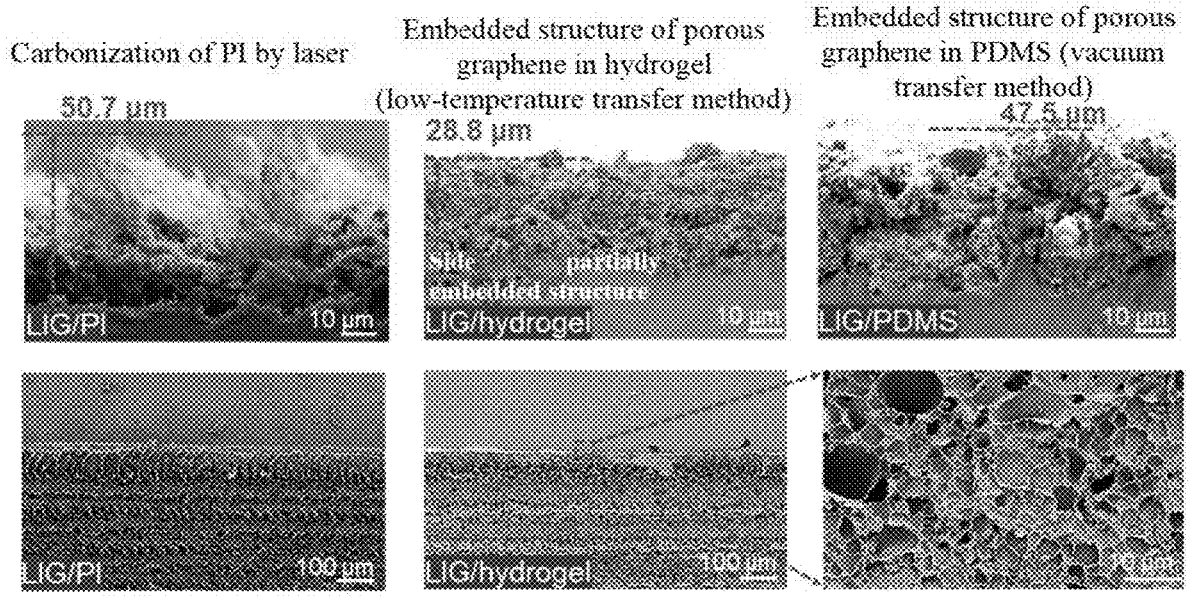
FIG. 6 shows superficial structures of the porous graphene transferred to a hydrogel surface by low-temperature freezing and to a PDMS elastomer by vacuum transfer method; and a structure of the porous graphene partially embedded in the gel under the low-temperature transfer method, and a structure of LIG completely encapsulated by the PDMS elastomer under the vacuum transfer method can be seen in the figure.
Figure 7:
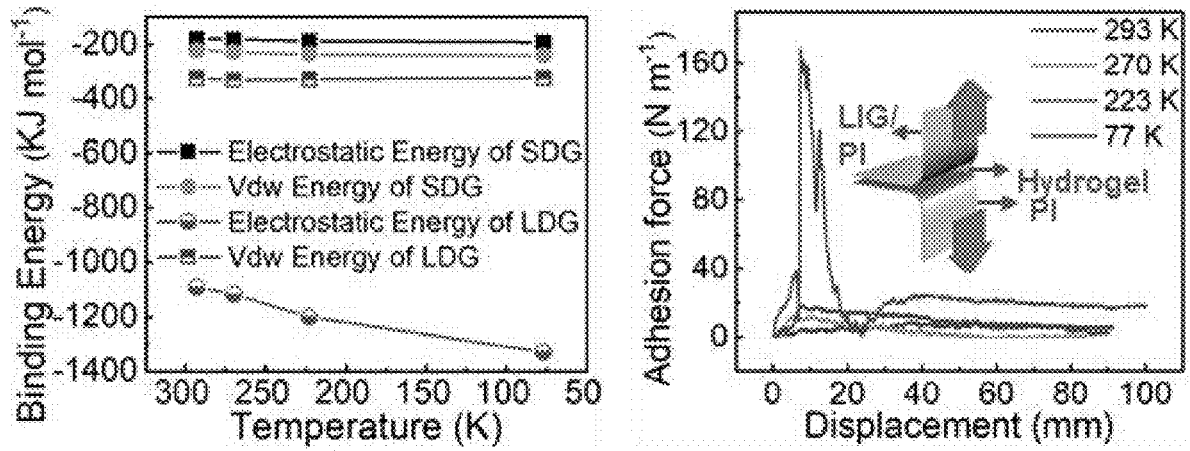
FIG. 7 shows binding energies of a large-defect graphene (LDG) model and a small-defect graphene (SDG) model with a hydrogel interface at different temperatures, including the results of molecular dynamics simulation calculations of vdW interactions (vdW energy) and electrostatic interactions (electrostatic energy) and the results of 180° adhesion peeling characterization at different treatment temperatures (293 K, 270 K, 223 K, and 77 K)

The present disclosure is described in further detail below in conjunction with the accompanying drawings and specific embodiments. Adhesive hydrogels used in the examples of the present disclosure are obtained by mixing a polyvinyl alcohol (PVA) solution, phytic acid, and saccharides, and any other arbitrary adhesive hydrogels can be used in the method of the present disclosure.

Embodiment 1 (Transfer on a Flexible Substrate PET)

1) A PPH hydrogel material with water content greater than 10% was prepared. A PVA solution with a mass fraction of 10% was prepared, and then the PVA solution, phytic acid, and glucose were mixed in a mass ratio of 5:5:1, followed by heating at 80° C. for later use.
2) In a grating mode, an electroconductive graphene pattern was prepared by carbonizing a PI thin film with a carbon dioxide infrared laser, with laser fluence of 7.24 $J/cm^{-2}$.
3) In an oxygen atmosphere, plasma surface hydrophilic treatment was performed on a PET thin film and an electroconductive graphene electrode.
4) The treated hydrophilic PET was spin-coated with a hydrogel solution obtained in 1) at a rotational speed of 2000 rpm/min, followed by heating at 60° C. to make the hydrogel rapidly semi-cured, a thickness of the gel after semi-curing being about 2.5 μm.
5) The electroconductive graphene electrode treated in 3) was adhered to a hydrogel thin film by face to face.
6) A sample after adhesion was clamped with a pair of tweezers to a subzero (−196° C. to −1° C.) environment for freezing.
7) A sample after freezing was taken out, and PI was carefully removed before the sample recovers from a frozen state to an elastic state, at which point a graphene electroconductive electrode pattern could be transferred onto a surface of the gel completely.

Embodiment 2 (Transfer on an Elastic Substrate PDMS)

1) A hydrogel material with water content greater than 10% was prepared. A PVA solution with a mass fraction of 10% was prepared, and then the PVA solution, phytic acid, and glucose were mixed in a mass ratio of 5:5:1, followed by heating at 80° C. for later use.
2) A PDMS precursor solution with a mass ratio of 20:1 of a bulk solution to a curing agent was prepared, and a PET thin film was spin-coated with a layer of the precursor solution at a rotational speed of 1500 rpm/min, followed by heating and curing at 90° C., a Young's modulus of the cured thin film being 0.12 MPa.
3) In a grating mode, an electroconductive graphene pattern was prepared by carbonizing a PI thin film with a carbon dioxide infrared laser, with laser fluence of 7.24 $J/cm^{-2}$.
4) In an oxygen atmosphere, plasma surface hydrophilic treatment was performed on a PDMS thin film obtained in 2) and an electroconductive graphene electrode obtained in 3).
5) The treated hydrophilic PDMS was spin-coated with a hydrogel solution obtained in 1) at a rotational speed of 2000 rpm/min, followed by heating at 60° C. to make the hydrogel rapidly semi-cured, a thickness of the gel after semi-curing being about 2.5 μm.
6) The electroconductive graphene electrode treated in 4) was adhered to a hydrogel thin film in 5) by face to face.

7) A sample after adhesion was clamped with a pair of tweezers to a subzero (−196° C. to −1° C.) environment for freezing.
8) A sample after freezing was taken out, and PI was carefully removed before the sample recovers from a frozen state to an elastic state, at which point a graphene electroconductive electrode pattern could be transferred onto a surface of the gel completely.
9) A PET substrate under PDMS was removed, at which point the electroconductive graphene, gel and PDMS composite left were stretchable as a whole.

Figure 8:
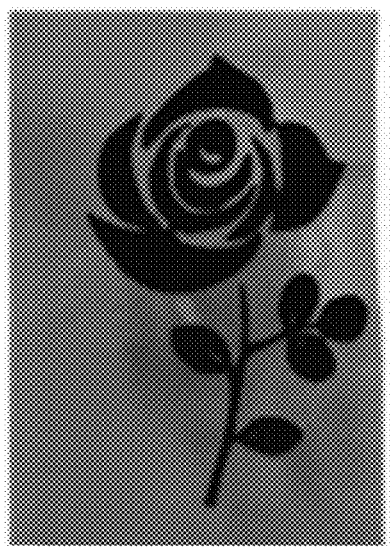
FIG. 8 shows the effect of a hydrogel transferred on a flexible substrate PET.
Figure 8:
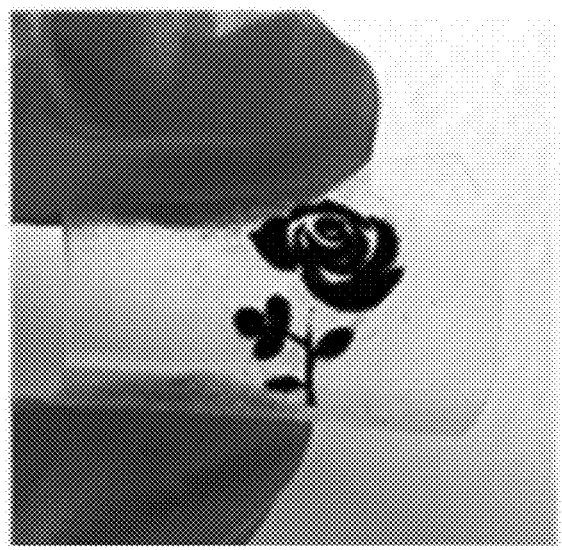
Figure 9:
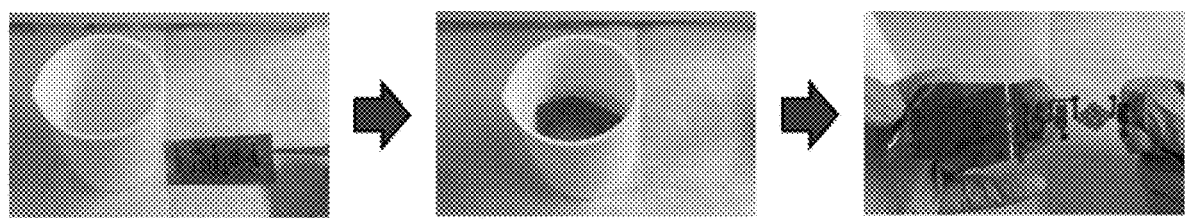
FIG. 9 shows the actual operational process of freezing transfer of a graphene electroconductive pattern based on the hydrogel.
Figure 10:
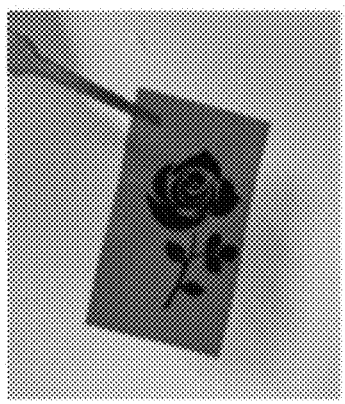
FIG. 10 shows the conformal attachment of a transferred graphene stretchable electrode on surfaces of a curved object and skin.
Figure 10:
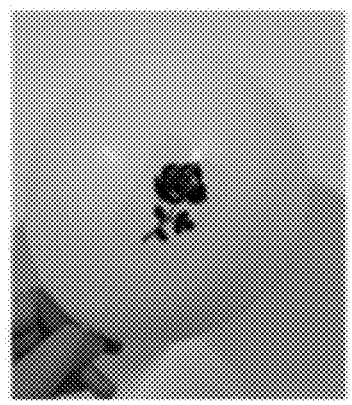
Figure 10:

In Embodiments 1 and 2, freezing transfer is performed on two different hydrogel support materials, a flexible PET substrate and an elastomeric PDMS substrate, respectively. FIG. 8 shows the effect of a hydrogel transferred on a flexible substrate PET, in which complete peeling of an electroconductive graphene pattern can be observed after the transfer. FIG. 9 shows the actual operational process of freezing transfer of a graphene electroconductive pattern based on a PPH hydrogel, in which the successful peeling and transfer of the electroconductive pattern can be observed. FIG. 10 shows the demonstration effect of an ultrathin graphene electroconductive stretchable electrode composite after successful freezing transfer seamlessly adhered to surfaces of an elastomeric object and skin.

Embodiment 3 (Effect of Young's Modulus of Elastomeric Substrate on TE)

1) A hydrogel material with water content greater than 10% was prepared. A PVA solution with a mass fraction of 10% was prepared, and then the PVA solution, phytic acid, and glucose were mixed in a mass ratio of 5:5:1, followed by heating at 80° C. for later use.
2) A PDMS precursor solution with a ratio of 5:1 of a bulk solution to a curing agent was prepared, and a PET thin film was spin-coated with a layer of the precursor solution at a rotational speed of 1500 rpm/min, followed by heating and curing at 90° C., a Young's modulus of the cured thin film being 0.89 MPa.
3) In a grating mode, an electroconductive graphene pattern was prepared by carbonizing a PI thin film with a carbon dioxide infrared laser, with laser fluence of 7.24 J/cm$^{-2}$.
4) In an oxygen atmosphere, plasma surface hydrophilic treatment was performed on a PDMS thin film and an electroconductive graphene electrode.
5) The treated hydrophilic PDMS was spin-coated with a hydrogel solution at a rotational speed of 2000 rpm/min, followed by heating at 60° C. to make the hydrogel rapidly semi-cured, a thickness of the gel after semi-curing being about 2.5 μm.
6) The electroconductive graphene electrode treated in 4) was adhered to a hydrogel thin film in 5) by face to face.
7) A sample after adhesion was clamped with a pair of tweezers to a subzero (−196° C. to −1° C.) environment for freezing.
8) A sample after freezing was taken out, and PI was carefully removed before the sample recovers from a frozen state to an elastic state, at which point a graphene electroconductive electrode pattern could be transferred onto a surface of the gel.

Embodiment 4 (Effect of Young's Modulus of Elastomeric Substrate on TE)

1) A hydrogel material with water content greater than 10% was prepared. A PVA solution with a mass fraction of 10% was prepared, and then the PVA solution, phytic acid, and glucose were mixed in a mass ratio of 5:5:1, followed by heating at 80° C. for later use.
2) A PDMS precursor solution with a ratio of 10:1 of a bulk solution to a curing agent was prepared, and a PET thin film was spin-coated with a layer of the precursor solution at a rotational speed of 1500 rpm/min, followed by heating and curing at 90° C., a Young's modulus of the cured thin film being 0.78 MPa.
3) In a grating mode, an electroconductive graphene pattern was prepared by carbonizing a PI thin film with a carbon dioxide infrared laser, with laser fluence of 7.24 J/cm$^{-2}$.
4) In an oxygen atmosphere, plasma surface hydrophilic treatment was performed on a PDMS thin film and an electroconductive graphene electrode.
5) The treated hydrophilic PDMS was spin-coated with a hydrogel solution at a rotational speed of 2000 rpm/min, followed by heating at 60° C. to make the hydrogel rapidly semi-cured, a thickness of the gel after semi-curing being about 2.5 μm.
6) The electroconductive graphene electrode treated in 4) was adhered to a hydrogel thin film in 5) by face to face.
7) A sample after adhesion was clamped with a pair of tweezers to a subzero (−196° C. to −1° C.) environment for freezing.
8) A sample after freezing was taken out, and PI was carefully removed before the sample recovers from a frozen state to an elastic state, at which point a graphene electroconductive electrode pattern could be transferred onto a surface of the gel.

Embodiment 5

1) A hydrogel material with water content greater than 10% was prepared. A PVA solution with a mass fraction of 10% was prepared, and then the PVA solution, phytic acid, and glucose were mixed in a mass ratio of 5:5:1, followed by heating at 80° C. for later use.
2) A PDMS precursor solution with a ratio of 20:1 of a bulk solution to a curing agent was prepared, and a PET thin film was spin-coated with a layer of the precursor solution at a rotational speed of 1500 rpm/min, followed by heating and curing at 90° C., a Young's modulus of the cured thin film being 0.12 MPa.
3) In a grating mode, an electroconductive graphene pattern was prepared by carbonizing a PI thin film with a carbon dioxide infrared laser, with laser fluence of 7.24 J/cm$^{-2}$.
4) In an oxygen atmosphere, plasma surface hydrophilic treatment was performed on a PDMS thin film and an electroconductive graphene electrode.
5) The treated hydrophilic PDMS was spin-coated with a hydrogel solution at a rotational speed of 2000 rpm/min, followed by heating at 60° C. to make the hydrogel rapidly semi-cured, a thickness of the gel after semi-curing being about 2.5 μm.
6) The electroconductive graphene electrode treated in 4) was adhered to a hydrogel thin film in 5) by face to face.
7) A sample after adhesion was clamped with a pair of tweezers to a subzero (−196° C. to −1° C.) environment for freezing.
8) A sample after freezing was taken out, and PI was carefully removed before the sample recovers from a frozen state to an elastic state, at which point a graphene electroconductive electrode pattern could be transferred onto a surface of the gel completely.

Embodiment 6

1) A hydrogel material with water content greater than 10% was prepared. A PVA solution with a mass fraction of 10% was prepared, and then the PVA solution, phytic acid, and glucose were mixed in a mass ratio of 5:5:1, followed by heating at 80° C. for later use.
2) A PDMS precursor solution with a ratio of 40:1 of a bulk solution to a curing agent was prepared, and a PET thin film was spin-coated with a layer of the precursor solution at a rotational speed of 1500 rpm/min, followed by heating and curing at 90° C., a Young's modulus of the cured thin film being 0.097 MPa.
3) In a grating mode, an electroconductive graphene pattern was prepared by carbonizing a PI thin film with a carbon dioxide infrared laser, with laser fluence of 7.24 J/cm$^{-2}$.
4) In an oxygen atmosphere, plasma surface hydrophilic treatment was performed on a PDMS thin film and an electroconductive graphene electrode.
5) The treated hydrophilic PDMS was spin-coated with a hydrogel solution at a rotational speed of 2000 rpm/min, followed by heating at 60° C. to make the hydrogel rapidly semi-cured, a thickness of the gel after semi-curing being about 2.5 μm.
6) The electroconductive graphene electrode treated in 4) was adhered to a hydrogel thin film in 5) by face to face.
7) A sample after adhesion was clamped with a pair of tweezers to a subzero (−196° C. to −1° C.) environment for freezing.
8) A sample after freezing was taken out, and PI was carefully removed before the sample recovers from a frozen state to an elastic state, at which point a graphene electroconductive electrode pattern could be transferred onto a surface of the gel.

Figure 11:
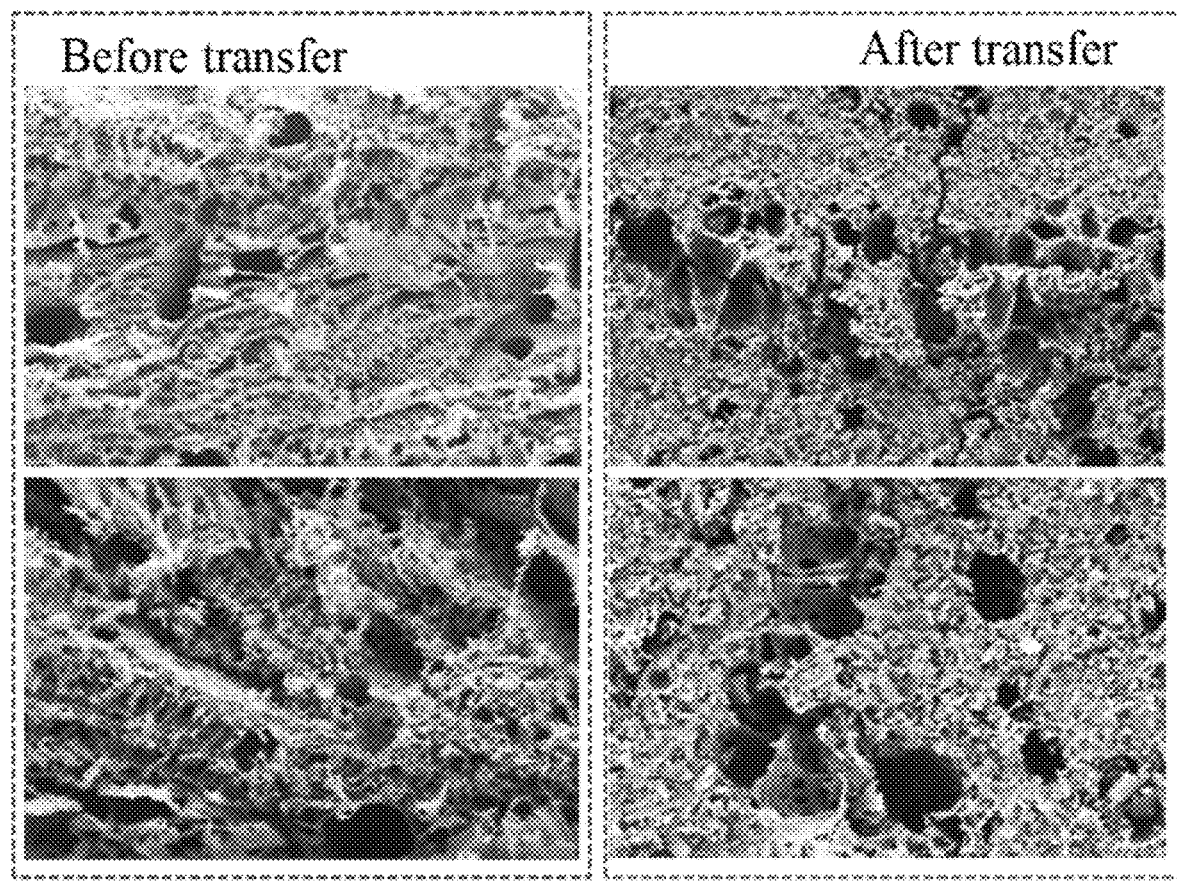
FIG. 11 shows a comparison of the surface morphology of LIG before and after freezing transfer.
Figure 12:
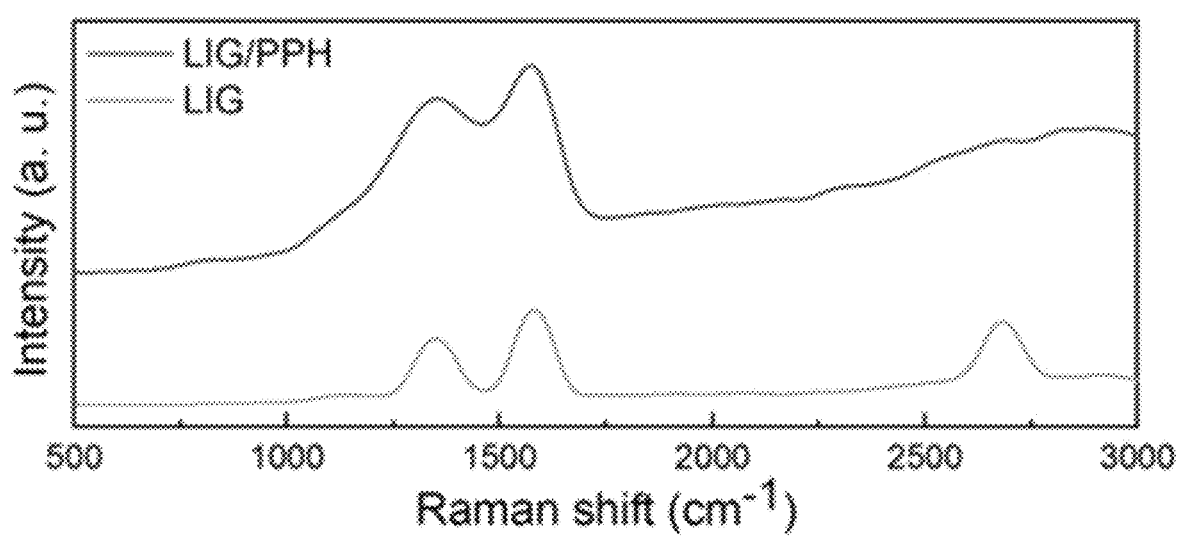
FIG. 12 shows the Raman characterization results of the porous graphene before (LIG) and after (LIG/PPH) freezing transfer.
Figure 13:
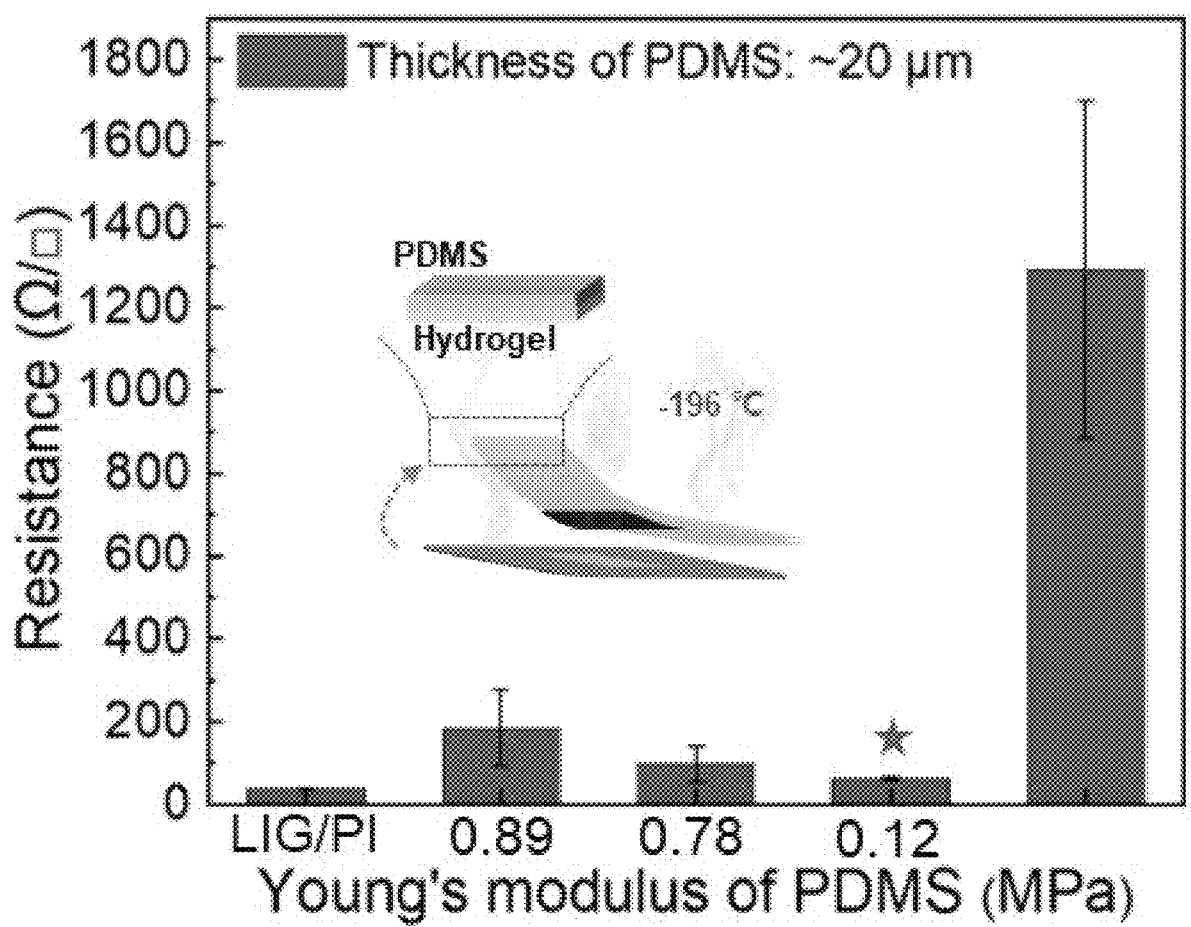
FIG. 13 shows the effect of a Young's modulus of an elastomer on the resistance of an electrode before and after freezing transfer.

PDMS is used as a support material in Embodiments 2-6, so that the prepared elastic composites are stretchable as a whole. FIG. 10 shows the seamless and conformal attachment of an electroconductive stretchable composite taking an elastomeric material as a support layer to a balloon and human skin. FIG. 11 shows the porous surface morphology of an electroconductive graphene material before and after transfer. FIG. 12 shows a comparison of Raman characteristic peaks of the electroconductive graphene material before and after transfer. The two sets of results illustrate that the freezing transfer method can better maintain the physical and chemical properties of the electroconductive material. The hydrogel support materials in Embodiments 2-6 have different Young's moduli, which affects the resistance after freezing transfer and TE. The results in FIG. 13 show that a Young's modulus (0.12 MPa) of a support material in Embodiment 5 is optimal to ensure a smaller pre- and post-transfer resistance difference and a higher TE.

Embodiment 7 (Effect of Laser Fluence on Transfer Effect)

1) A hydrogel material with water content greater than 10% was prepared. A PVA solution with a mass fraction of 10% was prepared, and then the PVA solution, phytic acid, and glucose were mixed in a mass ratio of 5:5:1, followed by heating at 80° C. for later use.
2) A PDMS precursor solution with a ratio of 20:1 of a bulk solution to a curing agent was prepared, and a PET thin film was spin-coated with a layer of the precursor solution at a rotational speed of 1500 rpm/min, followed by heating and curing at 90° C., a Young's modulus of the cured thin film being 0.12 MPa.
3) In a grating mode, an electroconductive graphene pattern was prepared by carbonizing a PI thin film with a carbon dioxide infrared laser, with laser fluence of 6.43 J/cm$^{-2}$.
4) In an oxygen atmosphere, plasma surface hydrophilic treatment was performed on a PDMS thin film and an electroconductive graphene electrode.
5) The treated hydrophilic PDMS was spin-coated with a hydrogel solution at a rotational speed of 2000 rpm/min, followed by heating at 60° C. to make the hydrogel rapidly semi-cured, a thickness of the gel after semi-curing being about 2.5 μm.
6) The electroconductive graphene electrode treated in 4) was adhered to a hydrogel thin film in 5) by face to face.
7) A sample after adhesion was clamped with a pair of tweezers to a subzero (−196° C. to −1° C.) environment for freezing.
8) A sample after freezing was taken out, and PI was carefully removed before the sample recovers from a frozen state to an elastic state, at which point a graphene electroconductive electrode pattern could be transferred onto a surface of the gel.

Embodiment 8

1) A hydrogel material with water content greater than 10% was prepared. A PVA solution with a mass fraction of 10% was prepared, and then the PVA solution, phytic acid, and glucose were mixed in a mass ratio of 5:5:1, followed by heating at 80° C. for later use.
2) A PDMS precursor solution with a ratio of 20:1 of a bulk solution to a curing agent was prepared, and a PET thin film was spin-coated with a layer of the precursor solution at a rotational speed of 1500 rpm/min, followed by heating and curing at 90° C., a Young's modulus of the cured thin film being 0.12 MPa.
3) In a grating mode, an electroconductive graphene pattern was prepared by carbonizing a PI thin film with a carbon dioxide infrared laser, with laser fluence of 7.24 J/cm$^{-2}$.
4) In an oxygen atmosphere, plasma surface hydrophilic treatment was performed on a PDMS thin film and an electroconductive graphene electrode.
5) The treated hydrophilic PDMS was spin-coated with a hydrogel solution at a rotational speed of 2000 rpm/min, followed by heating at 60° C. to make the hydrogel rapidly semi-cured, a thickness of the gel after semi-curing being about 2.5 μm.
6) The electroconductive graphene electrode treated in 4) was adhered to a hydrogel thin film in 5) by face to face.
7) A sample after adhesion was clamped with a pair of tweezers to a subzero (−196° C. to −1° C.) environment for freezing.
8) A sample after freezing was taken out, and PI was carefully removed before the sample recovers from a frozen state to an elastic state, at which point a graphene electroconductive electrode pattern could be transferred onto a surface of the gel completely.

Embodiment 9

1) A hydrogel material with water content greater than 10% was prepared. A PVA solution with a mass fraction of 10% was prepared, and then the PVA solution, phytic acid, and glucose were mixed in a mass ratio of 5:5:1, followed by heating at 80° C. for later use.
2) A PDMS precursor solution with a ratio of 20:1 of a bulk solution to a curing agent was prepared, and a PET thin film was spin-coated with a layer of the precursor solution at a rotational speed of 1500 rpm/min, followed by heating and curing at 90° C., a Young's modulus of the cured thin film being 0.12 MPa.
3) In a grating mode, an electroconductive graphene pattern was prepared by carbonizing a PI thin film with a carbon dioxide infrared laser, with laser fluence of 8.04 $J/cm^{-2}$.
4) In an oxygen atmosphere, plasma surface hydrophilic treatment was performed on a PDMS thin film and an electroconductive graphene electrode.
5) The treated hydrophilic PDMS was spin-coated with a hydrogel solution at a rotational speed of 2000 rpm/min, followed by heating at 60° C. to make the hydrogel rapidly semi-cured, a thickness of the gel after semi-curing being about 2.5 µm.
6) The electroconductive graphene electrode treated in 4) was adhered to a hydrogel thin film in 5) by face to face.
7) A sample after adhesion was clamped with a pair of tweezers to a subzero (−196° C. to −1° C.) environment for freezing.
8) A sample after freezing was taken out, and PI was carefully removed before the sample recovers from a frozen state to an elastic state, at which point a graphene electroconductive electrode pattern could be transferred onto a surface of the gel.

Embodiment 10

1) A hydrogel material with water content greater than 10% was prepared. A PVA solution with a mass fraction of 10% was prepared, and then the PVA solution, phytic acid, and glucose were mixed in a mass ratio of 5:5:1, followed by heating at 80° C. for later use.
2) A PDMS precursor solution with a ratio of 20:1 of a bulk solution to a curing agent was prepared, and a PET thin film was spin-coated with a layer of the precursor solution at a rotational speed of 1500 rpm/min, followed by heating and curing at 90° C., a Young's modulus of the cured thin film being 0.12 MPa.
3) In a grating mode, an electroconductive graphene pattern was prepared by carbonizing a PI thin film with a carbon dioxide infrared laser, with laser fluence of 8.85 $J/cm^{-2}$.
4) In an oxygen atmosphere, plasma surface hydrophilic treatment was performed on a PDMS thin film and an electroconductive graphene electrode.
5) The treated hydrophilic PDMS was spin-coated with a hydrogel solution at a rotational speed of 2000 rpm/min, followed by heating at 60° C. to make the hydrogel rapidly semi-cured, a thickness of the gel after semi-curing being about 2.5 µm.
6) The electroconductive graphene electrode treated in 4) was adhered to a hydrogel thin film in 5) by face to face.
7) A sample after adhesion was clamped with a pair of tweezers to a subzero (−196° C. to −1° C.) environment for freezing.
8) A sample after freezing was taken out, and PI was carefully removed before the sample recovers from a frozen state to an elastic state, at which point a graphene electroconductive electrode pattern could be transferred onto a surface of the gel.

Figure 14:
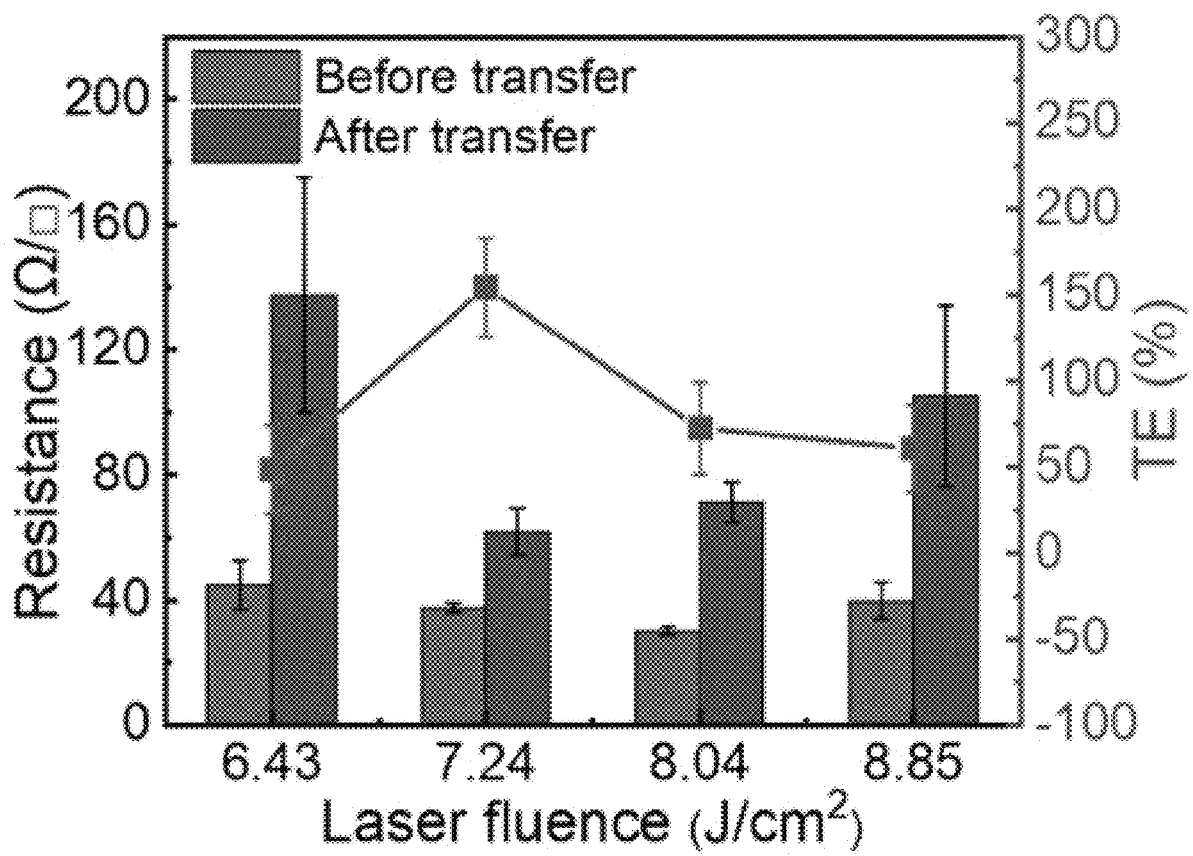
FIG. 14 shows the effect of different laser fluences on the freezing transfer efficiency (TE)

Different laser fluences for carbonizing the PI thin films in Embodiments 7-10 affect the resistance change before and after the transfer and on the TE. The laser fluence affects the pore shape and porosity of graphene, thus affecting the interfacial adhesion force between the gel and graphene at low temperatures. The results in FIG. 14 show that at the laser fluence of 7.24 $J/cm^{-2}$, a resistance change rate is less than 50% before and after transfer and a batch TE is the optimal, up to 150%.

Embodiment 11 (Effect of Hydrogel Thickness on TE)

1) A hydrogel material with water content greater than 10% was prepared. A PVA solution with a mass fraction of 10% was prepared, and then the PVA solution, phytic acid, and glucose were mixed in a mass ratio of 5:5:1, followed by heating at 80° C. for later use.
2) A PDMS precursor solution with a ratio of 20:1 of a bulk solution to a curing agent was prepared, and a PET thin film was spin-coated with a layer of the precursor solution at a rotational speed of 1500 rpm/min, followed by heating and curing at 90° C., a Young's modulus of the cured thin film being 0.12 MPa.
3) In a grating mode, an electroconductive graphene pattern was prepared by carbonizing a PI thin film with a carbon dioxide infrared laser, with laser fluence of 8.04 $J/cm^{-2}$.
4) In an oxygen atmosphere, plasma surface hydrophilic treatment was performed on a PDMS thin film and an electroconductive graphene electrode.
5) The treated hydrophilic PDMS was spin-coated with a hydrogel solution at a rotational speed of 1000 rpm/min, followed by heating at 60° C. to make the hydrogel rapidly semi-cured, a thickness of the gel after semi-curing being about 3 µm.
6) The electroconductive graphene electrode treated in 4) was adhered to a hydrogel thin film in 5) by face to face.
7) A sample after adhesion was clamped with a pair of tweezers to a subzero (−196° C. to −1° C.) environment for freezing.
8) A sample after freezing was taken out, and PI was carefully removed before the sample recovers from a frozen state to an elastic state, at which point a graphene electroconductive electrode pattern could be transferred onto a surface of the gel.

Embodiment 12

1) A hydrogel material with water content greater than 10% was prepared. A PVA solution with a mass fraction of 10% was prepared, and then the PVA solution, phytic acid, and glucose were mixed in a mass ratio of 5:5:1, followed by heating at 80° C. for later use.

2) A PDMS precursor solution with a ratio of 20:1 of a bulk solution to a curing agent was prepared, and a PET thin film was spin-coated with a layer of the precursor solution at a rotational speed of 1500 rpm/min, followed by heating and curing at 90° C., a Young's modulus of the cured thin film being 0.12 MPa.
3) In a grating mode, an electroconductive graphene pattern was prepared by carbonizing a PI thin film with a carbon dioxide infrared laser, with laser fluence of 8.04 J/cm$^{-2}$.
4) In an oxygen atmosphere, plasma surface hydrophilic treatment was performed on a PDMS thin film and an electroconductive graphene electrode.
5) The treated hydrophilic PDMS was spin-coated with a hydrogel solution at a rotational speed of 3000 rpm/min, followed by heating at 60° C. to make the hydrogel rapidly semi-cured, a thickness of the gel after semi-curing being about 1.5 μm.
6) The electroconductive graphene electrode treated in 4) was adhered to a hydrogel thin film in 5) by face to face.
7) A sample after adhesion was clamped with a pair of tweezers to a subzero (−196° C. to −1° C.) environment for freezing.
8) A sample after freezing was taken out, and PI was carefully removed before the sample recovers from a frozen state to an elastic state, at which point a graphene electroconductive electrode pattern could be transferred onto a surface of the gel.

Embodiment 13

1) A hydrogel material with water content greater than 10% was prepared. A PVA solution with a mass fraction of 10% was prepared, and then the PVA solution, phytic acid, and glucose were mixed in a mass ratio of 5:5:1, followed by heating at 80° C. for later use.
2) A PDMS precursor solution with a ratio of 20:1 of a bulk solution to a curing agent was prepared, and a PET thin film was spin-coated with a layer of the precursor solution at a rotational speed of 1500 rpm/min, followed by heating and curing at 90° C., a Young's modulus of the cured thin film being 0.12 MPa.
3) In a grating mode, an electroconductive graphene pattern was prepared by carbonizing a PI thin film with a carbon dioxide infrared laser, with laser fluence of 8.04 J/cm$^{-2}$.
4) In an oxygen atmosphere, plasma surface hydrophilic treatment was performed on a PDMS thin film and an electroconductive graphene electrode.
5) The treated hydrophilic PDMS was spin-coated with a hydrogel solution at a rotational speed of 4000 rpm/min, followed by heating at 60° C. to make the hydrogel rapidly semi-cured, a thickness of the gel after semi-curing being about 1.2 μm.
6) The electroconductive graphene electrode treated in 4) was adhered to a hydrogel thin film in 5) by face to face.
7) A sample after adhesion was clamped with a pair of tweezers to a subzero (−196° C. to −1° C.) environment for freezing.
8) A sample after freezing was taken out, and PI was carefully removed before the sample recovers from a frozen state to an elastic state, at which point a graphene electroconductive electrode pattern could be transferred onto a surface of the gel.

Embodiment 14

1) A hydrogel material with water content greater than 10% was prepared. A PVA solution with a mass fraction of 10% was prepared, and then the PVA solution, phytic acid, and glucose were mixed in a mass ratio of 5:5:1, followed by heating at 80° C. for later use.
2) A PDMS precursor solution with a ratio of 20:1 of a bulk solution to a curing agent was prepared, and a PET thin film was spin-coated with a layer of the precursor solution at a rotational speed of 1500 rpm/min, followed by heating and curing at 90° C., a Young's modulus of the cured thin film being 0.12 MPa.
3) In a grating mode, an electroconductive graphene pattern was prepared by carbonizing a PI thin film with a carbon dioxide infrared laser, with laser fluence of 8.04 J/cm$^{-2}$.
4) In an oxygen atmosphere, plasma surface hydrophilic treatment was performed on a PDMS thin film and an electroconductive graphene electrode.
5) The treated hydrophilic PDMS was spin-coated with a hydrogel solution at a rotational speed of 5000 rpm/min, followed by heating at 60° C. to make the hydrogel rapidly semi-cured, a thickness of the gel after semi-curing being about <1 μm.
6) The electroconductive graphene electrode treated in 4) was adhered to a hydrogel thin film in 5) by face to face.
7) A sample after adhesion was clamped with a pair of tweezers to a subzero (−196° C. to −1° C.) environment for freezing.
8) A sample after freezing was taken out, and PI was carefully removed before the sample recovers from a frozen state to an elastic state, at which point a small part of a graphene electroconductive electrode pattern could be transferred onto a surface of the gel.

Figure 15:
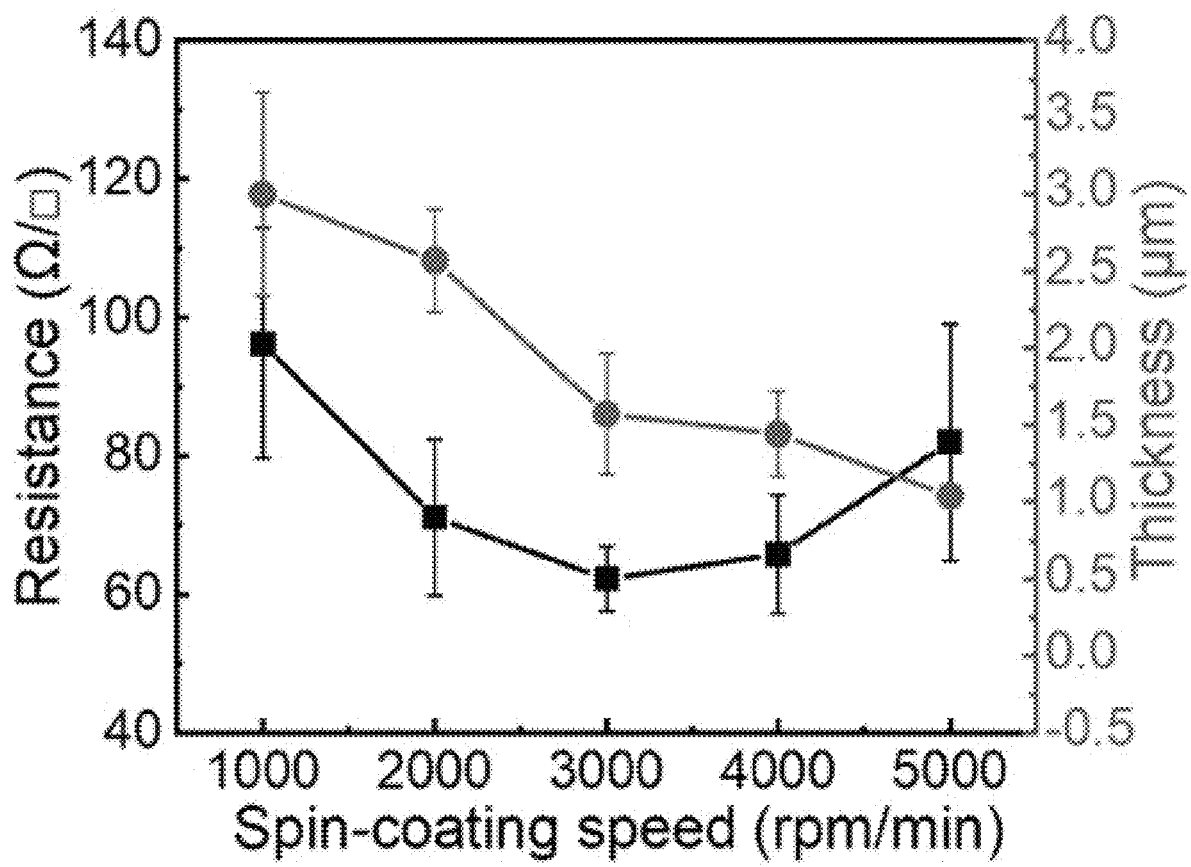
FIG. 15 shows the effect of a thickness of a hydrogel thin film on the resistance of a graphene electrode before and after freezing transfer.

Different spin-coating speeds of the gel solutions in Embodiments 11-14 result in different thicknesses of the hydrogels obtained, which has an effect on the resistance change before and after the transfer and on the TE. The results in FIG. 15 show that the hydrogel thickness range of 1-1.5 μm in Embodiments 12 and 13, i.e., spin-coating speeds of 3,000 and 4,000 rpm/min, minimizes the resistance change before and after the transfer, with an optimal effect after the transfer. This result illustrates that on the premise of a homogeneous gel without defects, the thinner the gel, the stronger the peeling adhesion strength between interfaces of gel and graphene at low temperatures.

Embodiment 15 (Multifunctional Flexible Sensor Manufacturing)

1) A hydrogel material with water content greater than 10% was prepared. A PVA solution with a mass fraction of 10% was prepared, and then the PVA solution, phytic acid, and glucose were mixed in a mass ratio of 5:5:1, followed by heating at 80° C. for later use.
2) A PDMS precursor solution with a ratio of 20:1 of a bulk solution to a curing agent was prepared, and a PET thin film was spin-coated with a layer of the precursor solution at a rotational speed of 1500 rpm/min, followed by heating and curing at 90° C., a Young's modulus of the cured thin film being 0.12 MPa.

3) In a grating mode, an electroconductive graphene pattern was prepared by carbonizing a PI thin film with a carbon dioxide infrared laser, with laser fluence of 7.24 J/cm$^{-2}$.
4) In an oxygen atmosphere, plasma surface hydrophilic treatment was performed on a PDMS thin film and an electroconductive graphene electrode.
5) The treated hydrophilic PDMS was spin-coated with a hydrogel solution obtained in 1) at a rotational speed of 4000 rpm/min, followed by heating at 60° C. to make the hydrogel rapidly semi-cured, a thickness of the gel after semi-curing being about <1 μm.
6) The electroconductive graphene electrode treated in 4) was adhered to a hydrogel thin film in 5) by face to face.
7) A sample after adhesion was clamped with a pair of tweezers to a subzero (−196° C. to −1° C.) environment for freezing.
8) A sample after freezing was taken out, and PI was carefully removed before the sample recovers from a frozen state to an elastic state, at which point a small part of a graphene electroconductive electrode pattern could be transferred onto a surface of the gel.
9) A strain sensor, a temperature sensor, a humidity sensor, and an ECG sensor were further prepared on the basis of the above methods in combination with the prior art.

Figure 16:
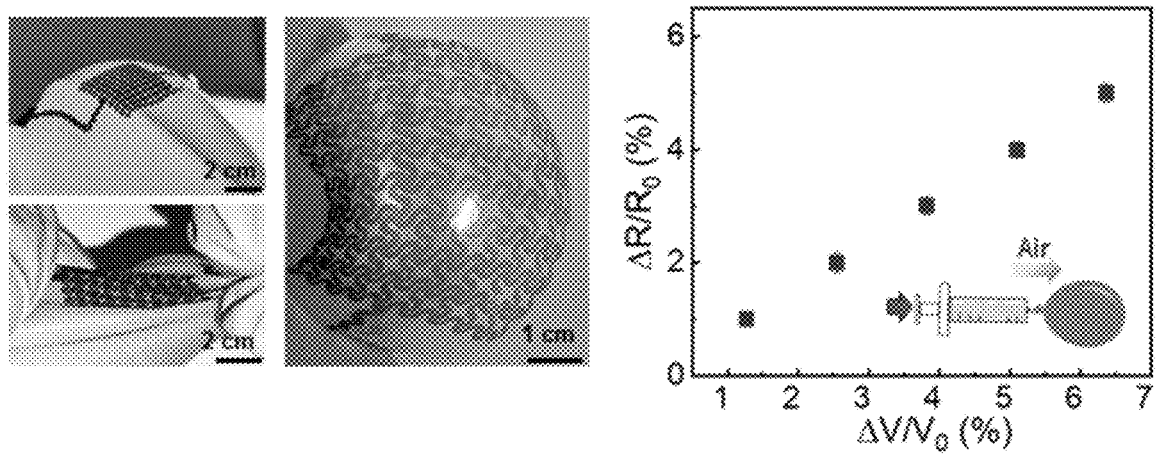
FIG. 16 shows a strain sensor and performance thereof.
Figure 17:
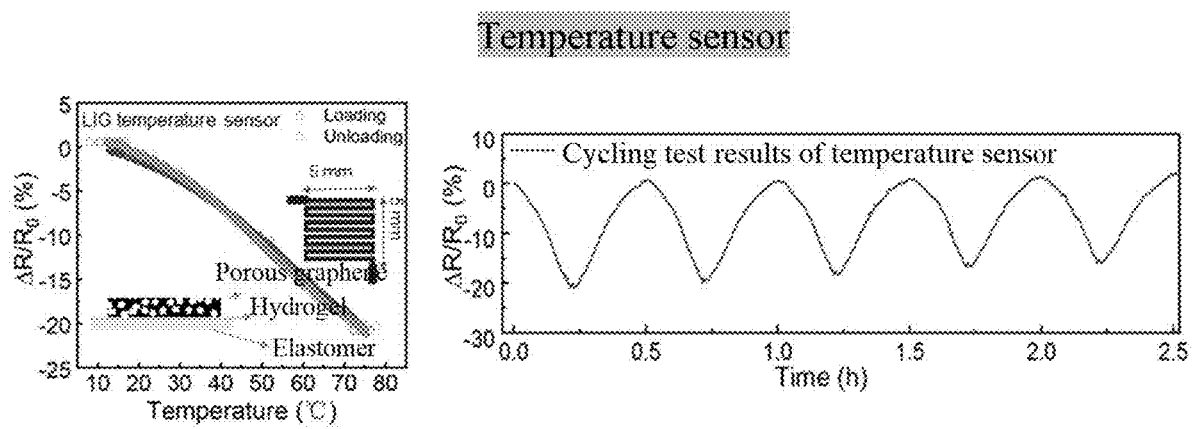
FIG. 17 shows a temperature sensor and performance thereof.
Figure 18:
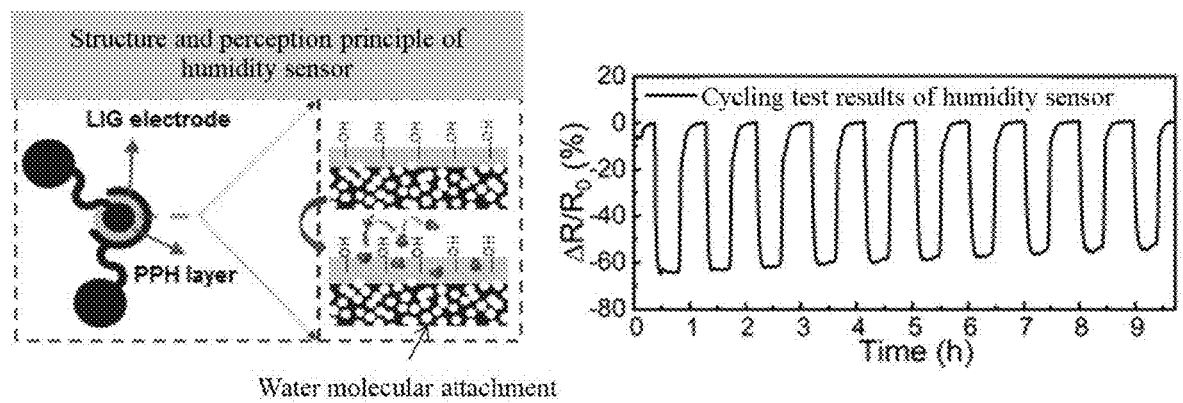
FIG. 18 shows a humidity sensor and performance thereof.
Figure 19:
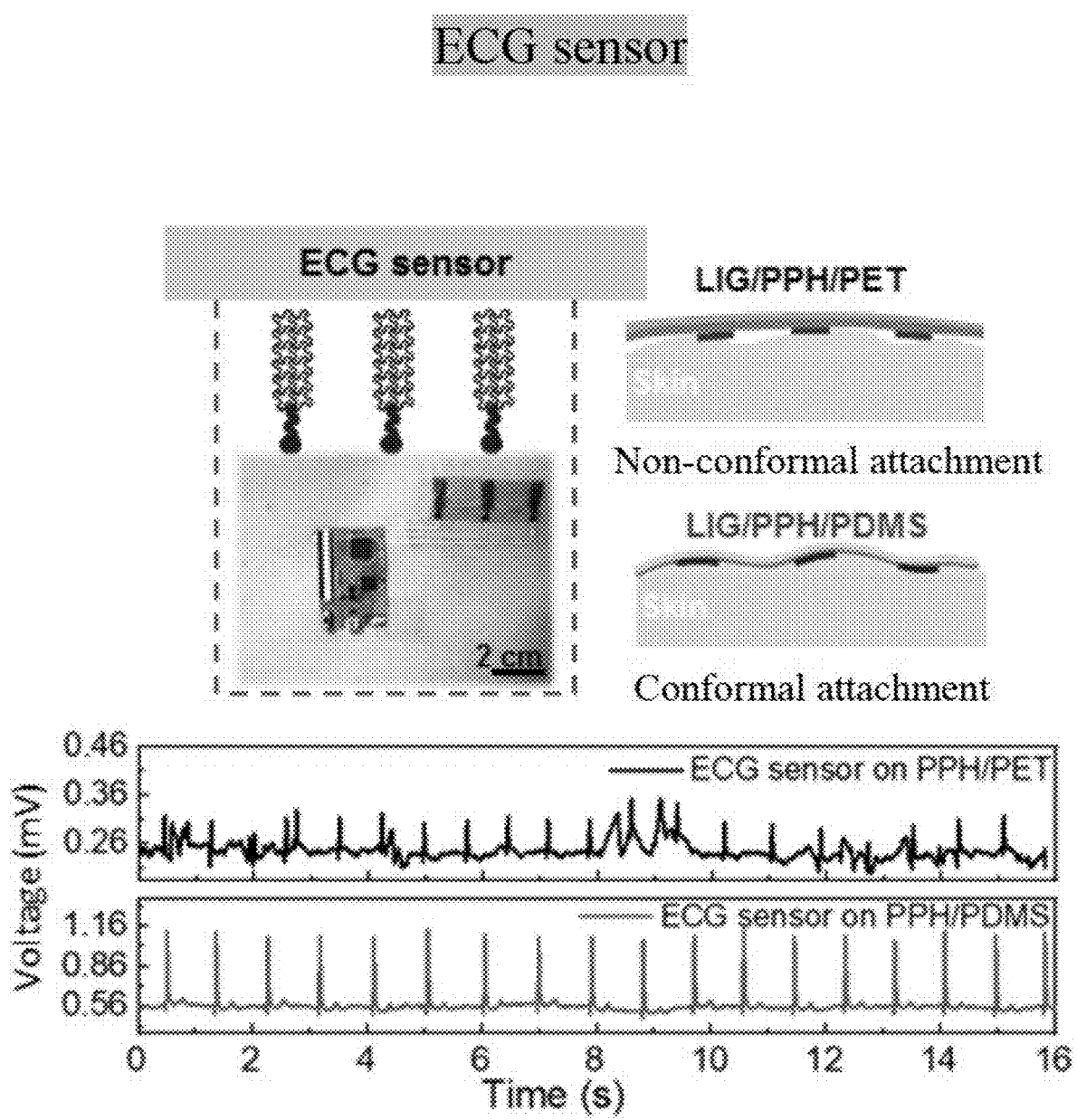
FIG. 19 shows an ECG sensor and performance thereof.

With Embodiments 1-14, the optimal transfer parameters of the graphene material can be obtained, and serve as the technical basis for manufacturing various sensors in Embodiment 15. FIG. 16 shows the performance of a strain sensor, which balances sensitivity and stretchability through a serpentine structural design, with a strain factor (GF) of about 30. FIG. 17 shows the performance of a temperature sensor with a wide temperature measurement range (10-75° C.), a linear response with low hysteresis, and a fine negative temperature coefficient (0.35%° C.$^{-1}$). FIG. 18 shows the performance of a humidity sensor, in which the gel is a moisture-sensitive material and the graphene is a sensing electrode, and the sensitivity of the humidity sensor obtained is 0.81% % RH$^{-1}$. FIG. 19 shows the performance of the ECG sensor with a high degree of conformability between an ultrathin elastomer composite (LIG/PPH/PDMS) and skin, which facilitates high-fidelity electrophysiological signal detection.

Embodiment 16 (Multimodal Flexible Sensor Integration System)

1) A hydrogel material with water content greater than 10% was prepared. A PVA solution with a mass fraction of 10% was prepared, and then the PVA solution, phytic acid, and glucose were mixed in a mass ratio of 5:5:1, followed by heating at 80° C. for later use.
2) A PDMS precursor solution with a ratio of 20:1 of a bulk solution to a curing agent was prepared, a PET thin film was spin-coated with a layer of the precursor solution at a rotational speed of 1500 rpm/min, followed by heating and curing at 90° C., a Young's modulus of the cured thin film being 0.12 Mpa, and two pieces were prepared for later use.
3) In a grating mode, an electroconductive graphene pattern including 4 sensors in Embodiment 15 was prepared by carbonizing a PI thin film with a carbon dioxide infrared laser, with laser fluence of 7.24 J/cm$^{-2}$.
4) In an oxygen atmosphere, plasma surface hydrophilic treatment was performed on a PDMS thin film and an electroconductive graphene electrode.
5) The treated hydrophilic PDMS was spin-coated with a hydrogel solution at a rotational speed of 4000 rpm/min, followed by heating at 60° C. to make the hydrogel rapidly semi-cured, a thickness of the gel after semi-curing being about <1 μm.
6) The electroconductive graphene electrode treated in 4) was adhered to a hydrogel thin film in 5) by face to face.
7) A sample after adhesion was clamped with a pair of tweezers to a subzero (−196° C. to −1° C.) environment for freezing.
8) A sample after freezing was taken out, and PI was carefully removed before the sample recovers from a frozen state to an elastic state, at which point a small part of a graphene electroconductive electrode pattern could be transferred onto a surface of the gel.
9) A liquid metal was printed on a surface of PDMS in 2) by a screen printing method.
10) Since a humidity sensor and an ECG sensor need to be in direct contact with skin, a laser cutter was used to selectively punch holes in a thin film in 9) for exposing the humidity sensor and the ECG sensor.
11) A graphene pattern on the gel in 8) was aligned with and adhered to a liquid metal electrode in 10), and the needless PET thin film was removed by low-temperature peeling in a liquid nitrogen environment.

Figure 20:
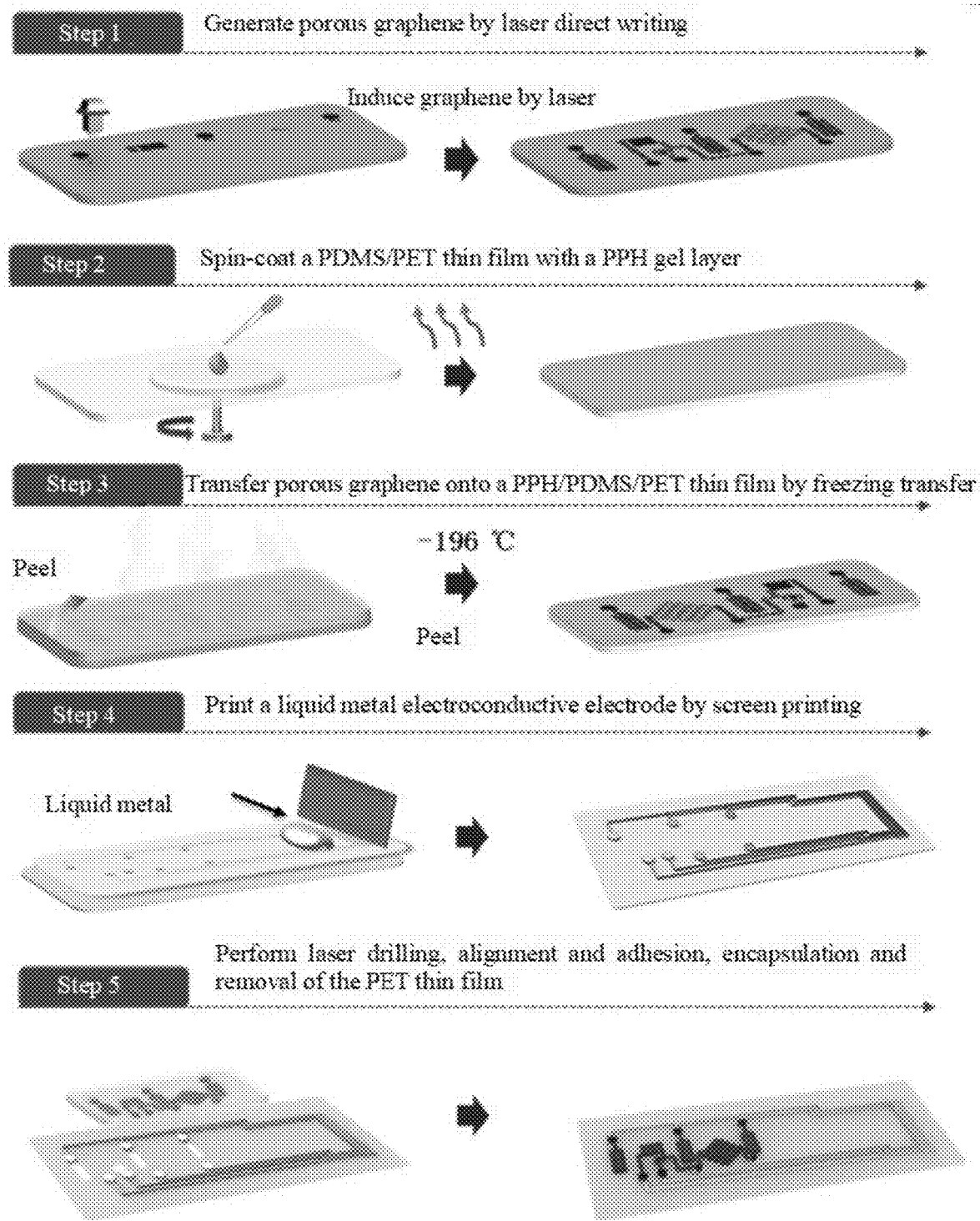
FIG. 20 is a schematic diagram of steps for manufacturing a multimodal flexible sensing system.
Figure 21:
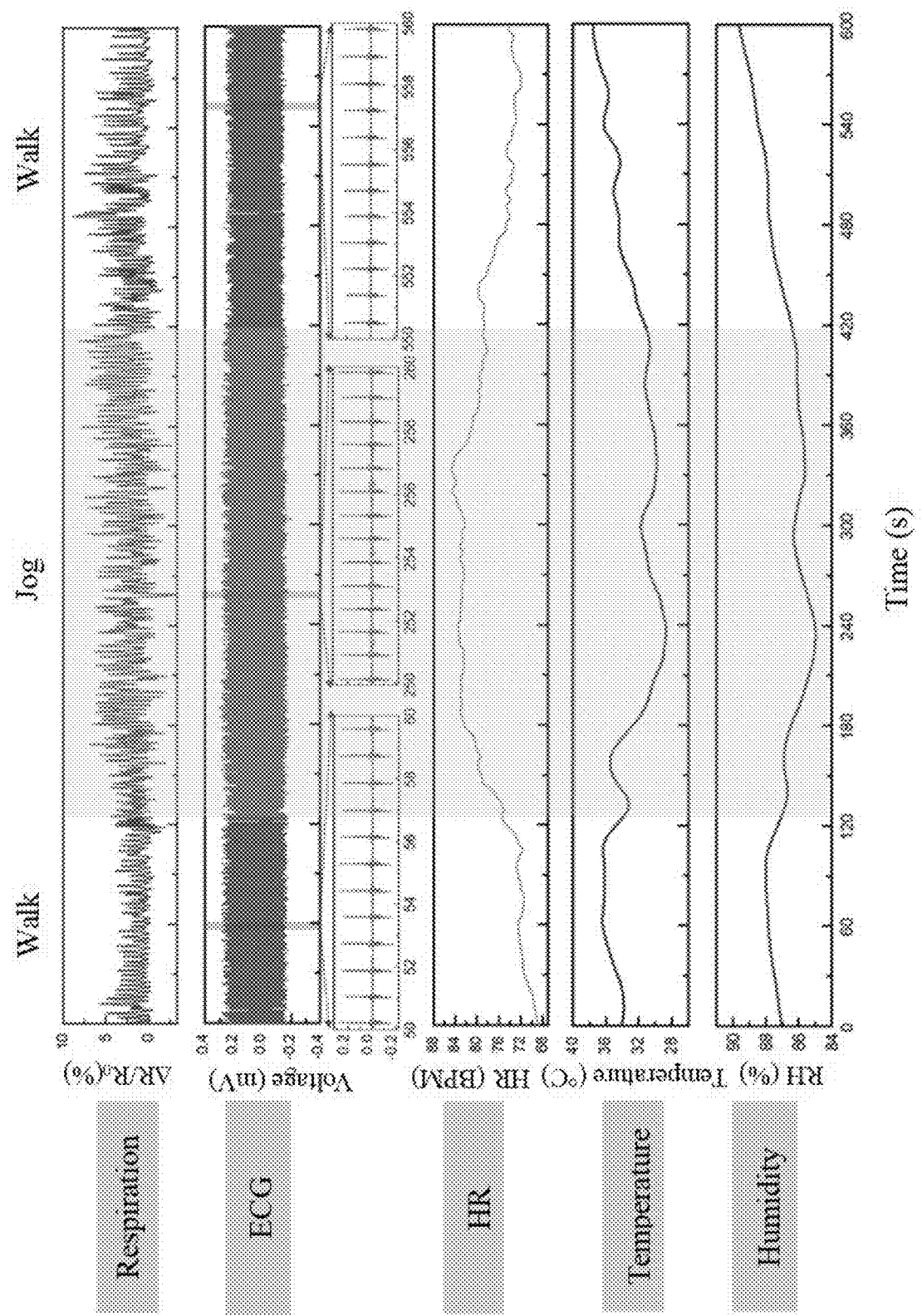
FIG. 21 shows the results of the multimodal flexible sensing system monitoring multichannel signals in real time.

With Embodiment 16, the multimodal flexible sensing system with flexible, ultrathin and stretchable characteristics can be obtained, with specific manufacturing steps as shown in FIG. 20. The sensing system can be conformally attached to the chest of a human body and connected to a flexible printed circuit board for real-time monitoring of respiration rate, ECG, heart rate (HR), body surface temperature, and body surface humidity. The respiration rate is obtained by the strain sensor monitoring the expansion and contraction of the chest, and HR is obtained by analyzing ECG signals. FIG. 21 shows the results of the multimodal flexible sensing system monitoring multichannel signals in real time, and the physiological condition of the human body in different states can be monitored.

The embodiments described above are only some preferred solutions of the present disclosure, but are not intended to limit the present disclosure. Various changes and variations may be made by those ordinary skilled in the related art without departing from the spirit and scope of the present disclosure. Therefore, all technical solutions obtained by means of equivalent replacement or equivalent transformation fall within the scope of protection of the present disclosure.

The invention claimed is:

1. A freezing transfer method for porous carbon electrodes based on subzero temperature, comprising:
   forming porous carbon electrodes to be transferred on a substrate,
   introducing a hydrogel film between the porous carbon electrodes to be transferred and a flexible/elastomeric material needing to receive the electrodes, wherein the hydrogel film is obtained by performing spin-coating with a hydrogel material which is prepared by mixing a polyvinyl alcohol (PVA) solution with a mass fraction of 10%, phytic acid and glucose in a mass ratio of 5:5:1 and then heating at 80° C., and the flexible/elastomeric material has a Young's modulus greater than that of the hydrogel film;

expanding the hydrogel film by low-temperature freezing to form a structural coupling with porous carbon, wherein water content of the hydrogel film needs to be controlled to be not less than 10 wt % prior to the low-temperature freezing;

removing the substrate to realize peeling prior to the hydrogel film completely recovering from a frozen state; and completing the transfer of the porous carbon electrodes.

2. The freezing transfer method for porous carbon electrodes based on subzero temperature according to claim 1, wherein the porous carbon electrodes to be transferred are laser-induced carbonized graphene materials or other porous carbon materials made by any methods.

3. The freezing transfer method for porous carbon electrodes based on subzero temperature according to claim 1, wherein the flexible/elastomeric material is a flexible material, an elastomeric material, or a combination of the two.

4. The freezing transfer method for porous carbon electrodes based on subzero temperature according to claim 1, wherein the low-temperature freezing has a temperature ranging from −196° C. to −1° C.

5. The freezing transfer method for porous carbon electrodes based on subzero temperature according to claim 1, wherein surfaces of the porous carbon electrodes and the flexible/elastomeric material are modified by plasma treatment prior to the introduction of the hydrogel film.

6. The freezing transfer method for porous carbon electrodes based on subzero temperature according to claim 5, wherein the plasma treatment needs to be performed in an oxygen atmosphere.

* * * * *